United States Patent [19]
Mellinger et al.

[11] Patent Number: 4,548,997
[45] Date of Patent: Oct. 22, 1985

[54] POLYETHERIMIDE-POLYCARBONATE BLENDS

[75] Inventors: Gary A. Mellinger, Louisville, Ky.; Harold F. Giles, Jr., Cheshire, Mass.; Fred Holub, Schenectady, N.Y.; William R. Schlich, Pittsfield, Mass.

[73] Assignee: General Electric Company, Pittsfield, Mass.

[21] Appl. No.: 612,913

[22] Filed: May 22, 1984

Related U.S. Application Data

[63] Continuation of Ser. No. 365,584, Apr. 5, 1982, abandoned.

[51] Int. Cl.$^4$ .................. C08L 69/00; C08L 79/08
[52] U.S. Cl. .................................. 525/433; 525/425
[58] Field of Search ........................................ 525/433

[56] References Cited

U.S. PATENT DOCUMENTS

| | | | |
|---|---|---|---|
| 3,946,090 | 3/1976 | Margotte et al. | 525/433 |
| 4,225,687 | 9/1980 | de Torres | 525/433 |
| 4,250,279 | 2/1981 | Robeson et al. | 525/433 |
| 4,387,193 | 6/1983 | Giles | 525/433 |
| 4,430,484 | 2/1984 | Quinn | 525/433 |

Primary Examiner—Wilbert J. Briggs, Sr.
Attorney, Agent, or Firm—Bernard, Rothwell & Brown

[57] ABSTRACT

Disclosed are blends of (a) a polyetherimide and (b) a thermoplastic polycarbonate. The blends exhibit a higher heat distortion temperature and an improved flexural strength and tensile strength over the polycarbonate component alone and have a higher impact strength than that associated with the polyetherimide component of the blends. In addition, the blends may exhibit good flame resistance.

7 Claims, No Drawings

POLYETHERIMIDE-POLYCARBONATE BLENDS

This is a continuation of application Ser. No. 365,584, filed Apr. 5, 1982, now abandoned.

This invention relates to a class of blends containing a polyetherimide and a thermoplastic polycarbonate. The blends exhibit a higher heat distortion temperature, an improved flexural strength and tensile strength over the polycarbonate component alone and have a higher impact strength than that associated with the polyetherimide component of the blends. In addition, the blends may exhibit good flame resistance.

The blends of the invention include a polyetherimide of the formula:

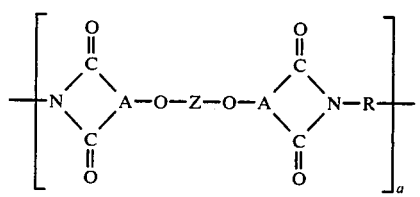

where a represents a whole number in excess of 1, e.g., 10 to 10,000 or more, the group —O—A< is selected from:

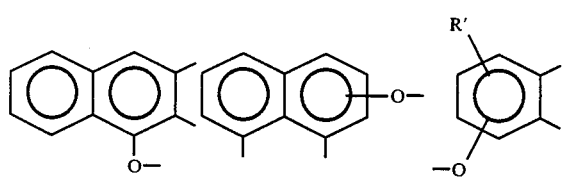

R' being hydrogen, lower alkyl or lower alkoxy, preferably the polyetherimide includes the latter —O—A< group where R' is hydrogen such that the polyetherimide is of the formula:

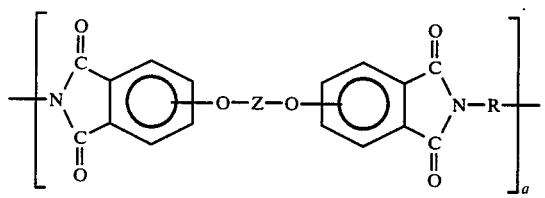

and the divalent bonds of the —O—Z—O— radical are in the 3,3'; 3,4'; 4,3' or the 4,4' position; Z is a member of the class consisting of (1) and

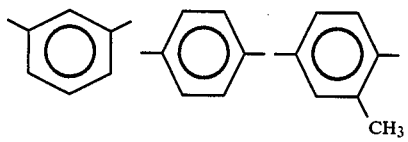

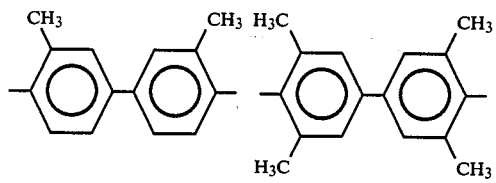

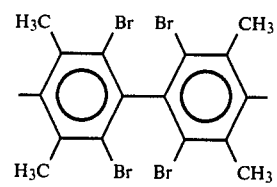

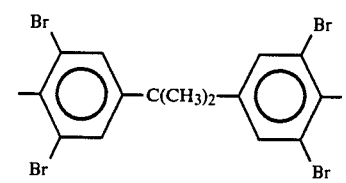

(2) divalent organic radicals of the general formula:

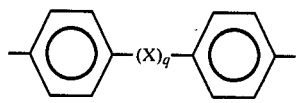

where X is a member selected from the class consisting of divalent radicals of the formulas,

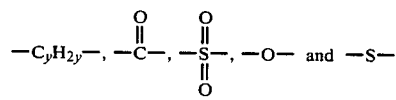

where q is 0 or 1, y is a whole number from 1 to 5; and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxane, and (3) divalent radicals included by the formula

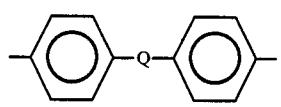

where Q is a member selected from the class consisting of

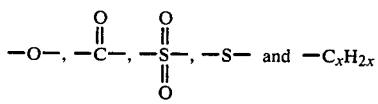

and x is a whole number from 1 to 5 inclusive. Particularly preferred polyetherimides for the purposes of the present invention include those where —O—A< and Z respectively are:

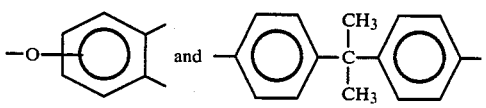

and R is selected from:

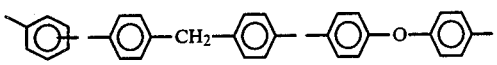

The polyetherimides where R is metaphenylene are most preferred.

Polycarbonates for use in the blends of the invention can be generally defined as high molecular weight, thermoplastic, aromatic polymers and include homopolycarbonates and copolycarbonates and mixtures thereof which have average molecular weights of about 8,000 to more than 200,000, preferably of about 20,000 to 80,000 and an I.V. of 0.40 to 1.0 dl/g as measured in methylene chloride at 25° C. These polycarbonates are derived from dihydric phenols and carbonate precursors and generally speaking, contain recurring structural units of the formula;

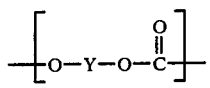

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane, and (3,3'-dichloro-4,4'-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the blends of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di-(halophenyl)carbonate such as di-(chlorophenyl)carbonate, di-(bromophenyl)carbonate, di-(trichlorophenyl)carbonate, di-(tribromophenyl)carbonate, etc., di-(alkylphenyl)carbonate such as di-(tolyl)carbonate, etc., di-(naphthyl)carbonate, di-(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included in the polycarbonates are the polymeric materials derived from a dihydric phenol, a dicarboxylic acid and carbonic acid. These are disclosed in U.S. Pat. No. 3,169,121 which is incorporated herein by reference.

The polyetherimides can be obtained by any of the methods well known to those skilled in the art including the reaction of any aromatic bis(ether anhydrides) of the formula

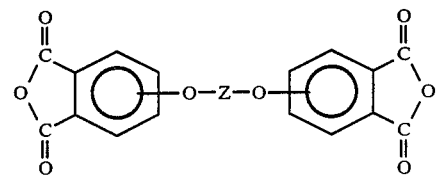

where Z is as defined hereinbefore with an organic diamine of the formula

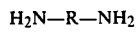

where R is as defined hereinbefore.

Aromatic bis(ether anhydride)s of the above formula include, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride; 4,4'-bis(2,3-dicarboxyphenoxy)diphenyl sulfone dianhydride; etc.,
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. Also, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenyl propane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyl disiloxane, and the like, and mixtures of such diamines.

In general, the reactions can be advantageously carried out employing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity $[\eta]$ greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the blends of this invention.

The polycarbonates of the subject blends can be manufactured by known processes, such as, for example, by reacting a dihydric phenol with a carbonate precursor such as diphenyl carbonate or phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, para-tertiary-butyl-phenol, etc. Preferably, phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkali earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

In accordance with the present invention, blends of a polyetherimide and a polycarbonate are generally obtainable in all proportions of the polymers relative to each other. Thus, the polyetherimide and carbonate components of the blend may be mixed in weight ratios of 1:99 to 99:1 relative to each other and such a range of mixtures may be combined with the thermoplastic component in weight ratios of 1:99 to 99:1. It may be generally desirable to include a minimum amount of, for example, about 2%, of each of the components to achieve the desired properties for the blend. By controlling the proportions of the components of the blend relative to each other, blends having certain predetermined useful properties which are improved over those of certain components alone may be readily obtained. In general, blends of the subject invention may exhibit, depending on the blend ratio of the components, one or more of the properties of high tensile and/or flexural strength, good impact strength and high heat distortion temperature.

It is contemplated that the blends of the present invention may also include other additive materials such as fillers, stabilizers, plasticizers, flexibilizers, surfactant agents, pigments, dyes, reinforcements, flame retardants and diluents in conventional amounts. It is also contemplated that the blends of the invention may include two or more polyetherimides in combination with one or more polycarbonates or two or more polycarbonates in combination with one or more polyetherimides.

Methods for forming blends of the present invention may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The subject blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated temperatures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectric capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Alternatively, solutions of the blends herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the blends of the present invention as overcoats on other types of insulation is not precluded.

Other applications which are contemplated for these blends include their use as binders for asbestos fibers, carbon fibers, and other fibrous materials in making brake linings. In addition, molding compositions and molded articles may be formed from the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific polyetherimide-polycarbonate blends in accordance with the present invention. It should be understood that the examples are given for the purpose of illustration and do not limit the invention. In the examples, all parts and percentages are by weight unless otherwise specified.

EXAMPLE I

Polyetherimide-polycarbonate blends according to the invention were prepared and tested for various mechanical properties.

The polyetherimide used in preparing the blend was of the structural formula:

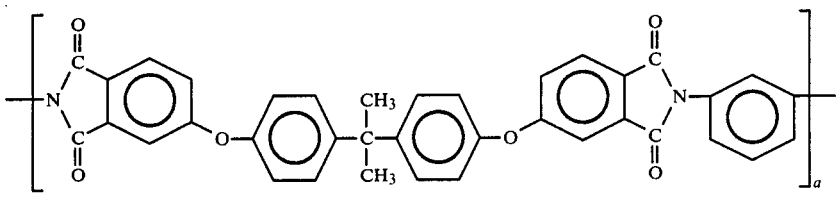

and the polycarbonate was a commercial polycarbonate sold under the trademark Lexan by the General Electric Company, Pittsfield, Mass. The polyetherimide alone had the physical properties set forth in Table I.

The two polymers were melt blended in a weight ratio of about 95 parts polyetherimide to about 5 parts polycarbonate and the blend viscosity measured on an Instron capillary rheometer at about 300° C. and a shear rate of about one sec.$^{-1}$. Upon solidification of the blend, various physical properties of the blend such as glass transition temperature (Tg), oxygen index (OI), tensile strength and elongation were measured. The results of these measurements are also set forth in Table I.

EXAMPLE II

The procedure of Example I was repeated with the exception that about 90 parts of polyetherimide and about 10 parts of polycarbonate were formulated to produce the blend according to the invention. The properties of the blend are set forth in Table I.

EXAMPLE III

The procedure of Example I was repeated with the exception that about 85 parts of polyetherimide and about 15 parts of polycarbonate, were formulated to produce the blend according to the invention. The properties of the blend are set forth in Table I.

TABLE I

| Example | Weight % Polyetherimide | Glass Transition Temperature (°C.) | Oxygen Index | Tensile Strength (psi) | Elongation (%) | Melt Viscosity (poise) |
|---|---|---|---|---|---|---|
|  | 100 | 208 | 51.8 | 13,4000 | 18 | $8.1 \times 10^4$ |
| I | 95 | 206/114 | 48.8 | 13,1000 | 20 | $7.9 \times 10^4$ |
| II | 90 | 205/122 | 49.4 | 7,700 | 10 | $6.3 \times 10^4$ |

TABLE I-continued

| Example | Weight % Polyetherimide | Glass Transition Temperature (°C.) | Oxygen Index | Tensile Strength (psi) | Elongation (%) | Melt Viscosity (poise) |
|---------|------------------------|-----------------------------------|--------------|------------------------|----------------|------------------------|
| III     | 85                     | 205/133                           | 49.1         | 800                    | 10             | $4.6 \times 10^4$      |

From the data set forth in the above table concerning various blends according to the present invention, it is apparent that the blends are not totally compatible since each polymer retains its own glass transition temperature. However, the blends do exhibit a good appearance and are suitable for a variety of applications.

EXAMPLE IV

A polyetherimide-polycarbonate blend according to the invention was prepared, the blend then molded into test specimens and the specimens tested for various physical properties.

The polyetherimide for the blend was prepared from the reaction product of essentially equimolar amounts of 2,2-bis[4-(3,4-dicarboxyphenoxy)phenyl]propane dianhydride and m-phenylene diamine produced at elevated temperature of about 250° C. to about 300° C. and under a nitrogen atmosphere. The polymer was extruded at about 300° C. to form a strand and mechanically chopped into pellets. A test specimen injection molded from the pellets had the physical properties set forth in Table II. The polycarbonate used in the blend was a bisphenol A type polycarbonate sold under the trademark LEXAN 141 by the General Electric Company, Pittsfield, Mass. This polycarbonate, prepared by reacting 2,2-bis(4-hydroxyphenyl)propane, (bisphenol-A) and phosgene in the presence of an acid acceptor and a molecular weight regulator, has an intrinsic viscosity of about 0.57 dl/g. Various physical properties of this polycarbonate are set forth in Table II.

The polymers were mixed in a weight ratio of about 10 parts polyetherimide and about 90 parts polycarbonate and then extruded in a 28 mm Werner & Pfleiderer extruder having a temperature profile varying from about 570° to 615° F. The resulting extrudate was comminuted into pellets and the pellets injection molded into test specimens at a temperature of about 550° F. Impact strength of the specimen was measured according to the notched and unnotched Izod test and the Gardner impact test and the results are set forth in Table II. The heat distortion temperature, tensile properties and flexural properties of the blend were also measured and are set forth in Table II.

EXAMPLE V

The procedure of Example IV was repeated with the exception that about 30 parts of polyetherimide and about 70 parts of polycarbonate, were formulated to produce the blend according to the invention and the blend was injection molded at a temperature of about 575° to 590° F. to produce test specimens. The results of the notched and unnotched Izod and Gardner impact tests as well as the heat distortion temperature tensile properties and flexural properties for the blend are detailed in Table II.

EXAMPLES VI

The procedure of Example IV was repeated with the exception that about 50 parts of polyetherimide and about 50 parts of polycarbonate, were formulated to produce the blend according to the invention and the blend was injection molded at about 575° to 620° F. to produce test specimens. The results of the notched and unnotched Izod and Gardner impact tests, as well as the heat distortion temperature, flexural properties and molding pressure for the blend are given in Table II.

EXAMPLE VII

The procedure of Example IV was repeated with the exception that about 70 parts of polyetherimide, and about 30 parts of polycarbonate were formulated to produce the blend according to the invention and the blend was extruded at about 620° to 650° F. and injection molded at about 650° F. to produce test specimens. The results of the notched and unnotched Izod and Gardner impact tests, as well as the heat distortion temperature, tensile properties and flexural properties for the blend are detailed in Table II.

EXAMPLE VIII

The procedure of Example VII was repeated with the exception that about 90 parts of polyetherimide, and about 10 parts of polycarbonate were formulated to produce the blend according to the invention. The results of the notched and unnotched Izod and Gardner impact tests, as well as the heat distortion, tensile properties and flexural properties for the blend are detailed in Table II.

TABLE II

| Material | % Polycarbonate | Izod Impact[1] (ft lbs/in), 3.2 mm Notched | Izod Impact[1] (ft lbs/in), 3.2 mm Unnotched | Gardner Impact (in-lbs) | HEAT DISTORTION TEMPERATURE @ 1.82 MPa °C. | Tensile Properties[3] Yield % | Tensile Properties[3] Yield (PSI × 10$^4$) | Tensile Properties[3] Failure % | Tensile Properties[3] Failure (PSI × 10$^4$) |
|----------|-----------------|---------------------------------------------|------------------------------------------------|-------------------------|--------------------------------------------|------------------------------|--------------------------------------------|--------------------------------|---------------------------------------------|
| Polycarbonate | 100 | 15.00 | 51.9 | >320 | 128 | 13.0 | 0.858 | 166 | 0.917 |
| Example IV | 90 | 3.02 | 56.5 | >320 | 129 | 12.2 | 0.877 | 135 | 0.852 |
| Example V | 70 | 0.99 | 50.7 | >320 | 132 | 11.0 | 0.933 | 15 | 0.836 |
| Example VI | 50 | 0.99 | 58.8 | >320 | 139 | 9.5 | 1.020 | 11 | 1.020 |
| Example VII | 30 | 0.78 | 60.7 | 133 | 158 | 12.0 | 1.290 | 115 | 1.250 |
| Example VIII | 10 | 0.60 | 20.9 | 92 | 185 | 13.0 | 1.460 | 41 | 1.170 |
| Polyetherimide | 0 | 0.64 | 23.0 | 155 | 192 | 13.0 | 1.530 | 30 | 1.220 |

| | Flexural Properties[4] | | | Glass Transition |
| | Initial Modulus | Strength @ 6.35 mm Deflection | Ultimate Strength | Temperature[5] (°C.) |

TABLE II-continued

| Material | (PSI × 10⁵) | (PSI × 10⁴) | (PSI × 10⁴) | Tg °C. | Tg °C. |
|---|---|---|---|---|---|
| Polycarbonate | 3.74 | 1.33 | 1.50 | — | 141 |
| Example IV | 3.56 | 1.29 | 1.47 | 216 | 149 |
| Example V | 3.78 | 1.39 | 1.56 | 215 | 149 |
| Example VI | 3.97 | 1.53 | 1.74 | 215 | 151 |
| Example VII | 4.21 | 1.66 | 2.00 | 214 | 151 |
| Example VIII | 4.67 | 1.86 | 2.31 | 212 | 143 |
| Polyetherimide | 4.80 | 1.94 | 2.38 | 217 | — |

[1]Tested according to ASTM method D-256.
[2]Tested according to ASTM method D-648 using a 3.2 mm bar.
[3]Tested according to ASTM method D-790 using a 3.2 mm bar at a crosshead speed of 1.27 mm/min.
[4]Tested according to ASTM method D-638 using a Type 1 bar with a 5.08 mm/min crosshead speed.
[5]Obtained by differential soarning calorimetry.

During the generation of the above data, several observations concerning the blends of the invention were made. One, the blends had a lower melt viscosity than the polyetherimide component alone which thereby allows the blends to be processed at a lower temperature. Second, the blends appeared to be one phase systems with no delamination or phase separation in the molded specimens although the specimens were actually a two-phase system as evidenced by two glass transition temperatures. Third, all the specimens were generally opaque in appearance. Fourth, some of the unnotched Izod values are not absolute values since the test specimens twisted or bent out of the path of the hammer upon impact rather than breaking and thus these values only represent impact strength values relative to the other specimens tested.

As to the physical properties of the blends, it is apparent from the above data that the heat distortion temperature and flexural and tensile properties of all the blends, particularly those containing in excess of about 50% polyetherimide were all improved over the polycarbonate component alone. The unnotched impact strength is generally improved over that of the polyetherimide component alone and the notched Izod and Gardner impact strengths are particuarly improved at a blend concentration of about 30% or more polycarbonate.

EXAMPLE IX

A polyetherimide-polyester carbonate blend according to the invention was prepared, the blend molded into test specimens, and the specimens tested for physical properties and for flame resistance.

The polyetherimide for the blend was prepared from the reaction product of essentially equimolar' amounts of 2,2-bis[4-(3,4-dicarboxyphenoxy)phenyl]propane dianhydride and m-phenylene diamine. A test specimen injection molded from the polyetherimide had the physical properties and the flame characteristics as set forth in Tables III and IV.

The polyester carbonate was derived from bisphenol A, isophthalic acid and a carbonate precursor with a 50:50 mole ratio isophthalic acid to carbonate precursor. The polyester carbonate alone had the physical properties and the flame characteristics as are set forth in Tables III and IV.

The two polymers were mixed in a weight ratio of about 25 parts polyetherimide and 75 parts polyester carbonate and extruded in a Werner & Pfleiderer extruder having a temperature of about 680° F. The resulting extrudate was comminuted into pellets and the pellets injection molded into test specimens at a temperature of about 680° F. Impact strength of a specimen was measured according to the notched Izod test, ASTM D-256, and the results are set forth in Table III. The heat distortion temperature, flexural strength and flexural modulus of the blend were also measured and are given in Table III. In addition, the flame resistance characteristics of the blend are set forth in Table IV as determined by the test set forth in Bulletin No. 94 of the Underwriters Laboratory (UL-94).

EXAMPLE X

The procedure of Example IX was repeated with the exception that about 50 parts of polyetherimide and about 50 parts of polyester carbonate were formulated to produce the blend according to the invention. The results of the notched Izod impact test as well as the heat distortion temperature, flexural strength, and flexural modulus for the blend are detailed in Table III. The flame resistance characteristics of the blend are set forth in Table IV.

EXAMPLE XI

The procedure of Example IX was repeated with the exception that about 75 parts of polyetherimide and about 25 parts of polyester carbonate were formulated to produce the blend according to the invention. The results of the notched Izod impact test as well as the heat distortion temperature, flexural strength, and flexural modulus for the blend are detailed in Table III. The flame resistance characteristics of the blend are set forth in Table IV.

TABLE III

| Example | Polyetherimide Content (%) | Notched Izod (ft-lb/in) | Heat Distortion Temperature (°F. at 264 psi) | Flexural Strength (psi) | Flexural Modulus (psi) |
|---|---|---|---|---|---|
| | 0 | 12.6 | 296 | 14,800 | 381,000 |
| IX | 25 | 4.4 | 309 | 16,800 | 400,000 |
| X | 50 | 7.0 | 329 | 17,900 | 418,000 |
| XI | 75 | 1.0 | 364 | 20,000 | 427,000 |
| | 100 | 0.75 | 396 | 24,800 | 482,000 |

TABLE IV

| Example | Polyetherimide Content (%) | V Burn Test (Seconds to Quench) | | | | V Burn Test (Comment) |
|---|---|---|---|---|---|---|
| | | 1st Ign. | 2nd Ign. | 3rd Ign. | 4th Ign. | |
| | 0 | 0,1 | 16,26 | >30,>30 | — | ND* |
| IX | 25 | 0,0 | 8,10 | >30,>30 | — | ND |
| X | 50 | 0,0 | 8,8 | >30,>30 | — | ND |
| XI | 75 | 0,0 | 2,2 | 5,6 | >30,>30 | ND |
| | 100 | 0,0 | 0,0 | 0,0 | 0,0 | ND |

*ND = No Drip

It is contemplated that the substitution of other polyetherimides or polycarbonates for the components of the blends of the above examples may result in the formulation of polymer blends having one or more improved characteristics such as impact strength, flame resistance, tensile properties, flexural properties and high heat distortion temperature over one or more of the polymer components taken alone.

While the present invention has been described with reference to particular embodiments thereof, it will be understood that numerous modifications may be made by those skilled in the art without actually departing from the spirit and scope of the invention as defined in the appended claims.

We claim:

1. A composition consisting essentially of a blend of (a) a polycarbonate and (b) a polyetherimide, wherein the polycarbonate consists of recurring structural units of the formula:

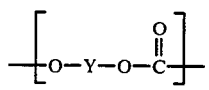

wherein Y is divalent aromatic radical of a dihydric phenol selected from the group consisting of 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3′,5′-tetrachloro-4,4′-dihydroxyphenyl)propane, 2,2-(3,5,3′,5′-tetrabromo-4,4′-dihydroxyphenyl)propane, and (3,3′-dichloro-4,4′-dihydroxyphenyl)methane.

2. A composition in accordance with claim 1, wherein the polyetherimide has the formula:

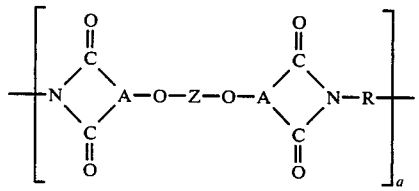

where a represents a whole number in excess of 1, the group —O—A is selected from:

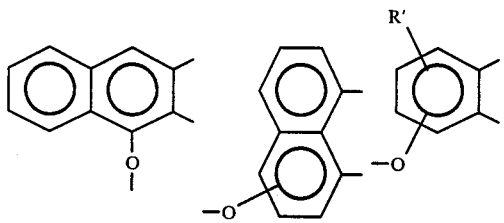

R′ being hydrogen, lower alkly or lower alkoxy, and Z is a member of the class consisting of (1)

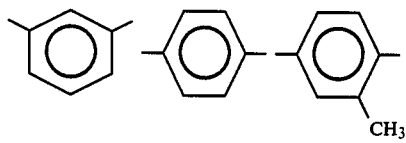

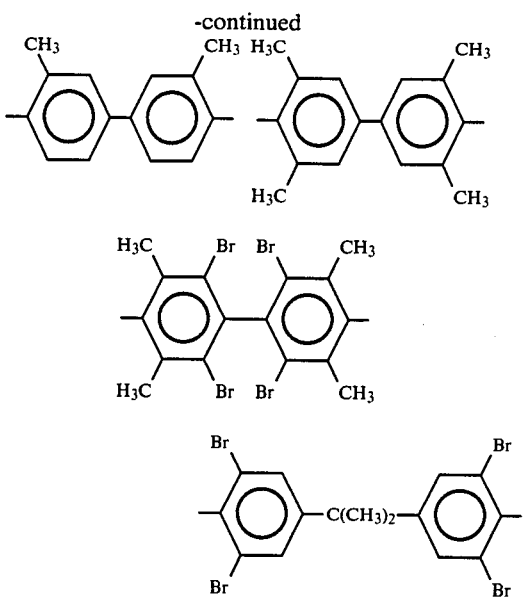

and (2) divalent organic radicals of the general formula:

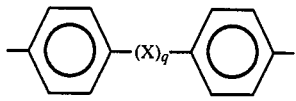

where X is a member selected from the class consisting of divalent radicals of the formulas,

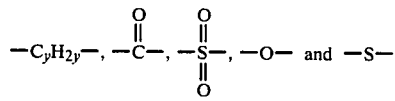

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

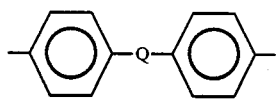

where Q is a member selected from the class consisting of

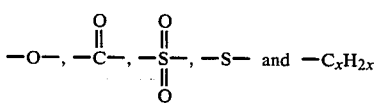

where x is a whole number from 1 to 5 inclusive.

3. A composition in accordance with claim 2 wherein the polyetherimide is of the formula:

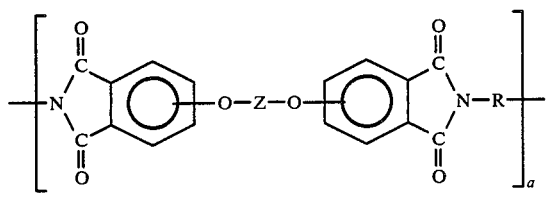

and the divalent bonds of the —O—Z—O— radical are in the 3,3'; 3,4'; 4,3' or the 4,4' position.

4. A composition in accordance with claims 3, wherein Z is;

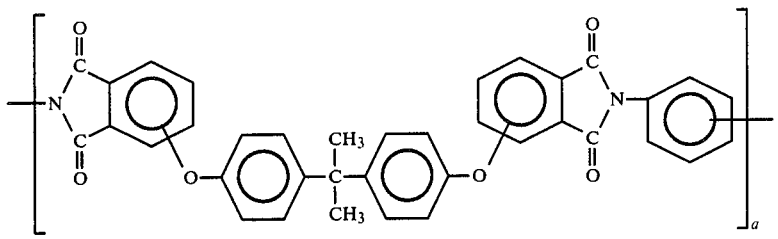

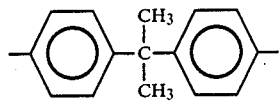

and R is selected from:

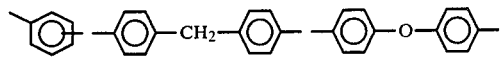

5. A composition in accordance with claims 4, wherein the polyetherimide is of the formula;

6. A composition in accordance with claim 1 wherein the dihydric phenol is bisphenol A and the carbonate precursor is carbonyl chloride.

7. A composition in accordance with claim 1 wherein the dihydric phenol is bisphenol A and the carbonate precursor is diphenyl carbonate.

* * * * *